Figure 1:
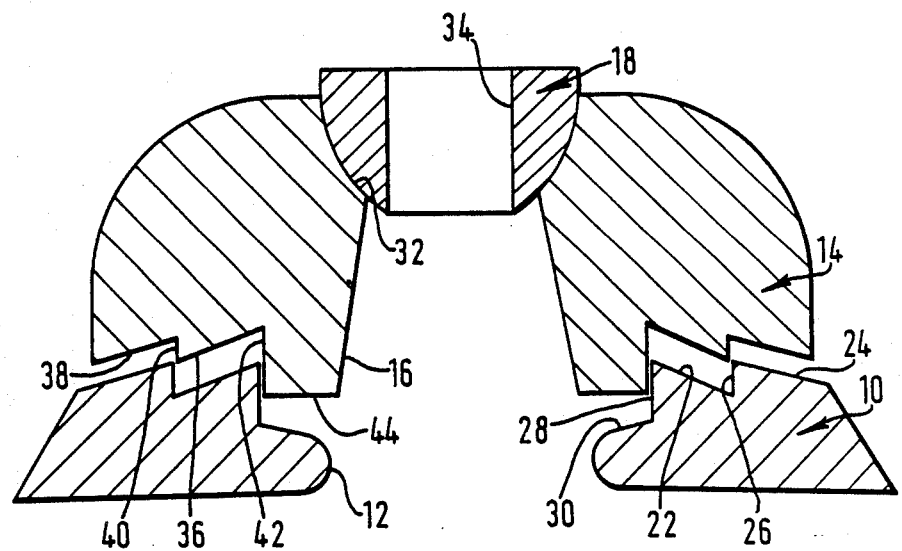

United States Patent [19]
Haynes

[11] Patent Number: 4,703,711
[45] Date of Patent: Nov. 3, 1987

[54] LOAD-INDICATING DEVICES

[75] Inventor: John M. Haynes, Derbyshire, England

[73] Assignee: The Clay Cross Company Limited, Chesterfield, England

[21] Appl. No.: 822,221

[22] Filed: Jan. 24, 1986

[30] Foreign Application Priority Data

Jan. 25, 1985 [GB] United Kingdom ............... 8501896

[51] Int. Cl.⁴ ................................................ G01L 5/00
[52] U.S. Cl. .................................... 116/212; 73/761; 116/DIG. 34; 441/8
[58] Field of Search .................... 411/2, 3, 5, 8–14, 411/537, 538; 116/212, DIG. 34; 73/761

[56] References Cited

U.S. PATENT DOCUMENTS

| | | | |
|---|---|---|---|
| 3,104,645 | 9/1963 | Harrison | 116/212 |
| 3,161,174 | 12/1964 | Harrison | 116/212 |
| 3,285,120 | 11/1966 | Kartiala | 411/8 |
| 3,469,492 | 9/1969 | Dahl | 411/11 |
| 3,476,010 | 11/1969 | Markey | 411/9 |
| 4,037,516 | 7/1977 | Hart | 411/8 |

FOREIGN PATENT DOCUMENTS 20289  6/1972 Japan ........................................ 411/8

Primary Examiner—Charles Frankfort
Assistant Examiner—W. Morris Worth
Attorney, Agent, or Firm—Young & Thompson

[57] ABSTRACT

The device consists of first and second load-receiving members, a breakable member and a part-spherical washer received in a seat in the second load-receiving member. In use, a load is applied by way of a rod or bar passing centrally through the load-receiving members and the breakable member positioned therebetween, the rod or bar also passing through a central bore in the washer and being angularly movable because of the support provided by the seat. When a predetermined load is achieved, annular cutting surfaces on the load-receiving member cut the breakable member with a predominantly shear action to indicate that the load has been achieved. Fractured parts of fingers of the bearing member are retained between surfaces to be visible at the periphery of the device.

16 Claims, 6 Drawing Figures

LOAD-INDICATING DEVICES

This invention relates to devices for indicating when an applied load has achieved a desired value. A device provided by the invention may be used when a load is applied to a rock bolt or a tie bar used, for example, to stablise a rock face or strengthen a brick or masonary structure, in a building, tunneling or mining project.

In the past applied loads have been measured using various hydraulic, electrical and optical load-indicating devices. These devices tend to be delicate and expensive and are therefore not completely satisfactory, particularly when used in building, tunneling, mining or civil engineering projects. One aim of the present invention is to overcome this disadvantage of the known devices.

It is one object of the present invention to provide a sturdy and inexpensive load-indicating device.

It is another object to provide a load-indicating device in which a breakable member is broken at a predetermined load with a breaking action which is at least in part shearing.

It is a further object of the invention to provide a load-indicating device which can be incorporated into end plates and pattresses such as are used in mining and civil engineering projects.

Yet another object is to provide a load-indicating device in which fractured portions of a breakable member are retained in the device for visual inspection after fracture.

The present invention provides a load-indicating device and load-indication method in which the load is applied to a breakable member which breaks when the load is equal to or greater than a predetermined value.

More specifically, the present invention provides a load-indicating device comprising first and second loadreceiving members which tend to move relative to each other when a load is applied to the device, a breakable member and means for applying the applied load to the breakable member in such a way that the breakable member breaks when the applied load is equal to or greater than a predetermined value and thus provides an indication that the predetermined load value has been achieved or exceeded.

Usually, the applied load will be increased from a value less than the predetermined value and the breakable member will then break upon the predetermined load value being achieved.

Preferably, the breakable member is positionable between the load-receiving members. In such a construction, the load-application means may comprise formations on at least one of the surfaces of the loadreceiving members which contact the breakable member, the formations acting upon the breakable member to produce the desired breaking action when the predetermined load value is reached. Advantageously, the breakable member is subjected to a shearing and/or bending action which causes breakage of the member, the spacing of the points of application of the load to the breakable member determining the relative magnitudes of the shearing and bending actions.

This shearing and/or bending action may be produced by a pair of annular cutting surfaces, the surfaces of the pair each being on a different one of the first and second load-receiving members and being relatively movable towards each other along the line of movement of the load-receiving members from an offset position prior to breaking of the breakable member. The annular cutting surfaces are preferably cylindrical and advantageously extend parallel to the direction of relative movement of the load-receiving members. For reception of the fractured parts of the breakable member after breakage, the device parts preferably form annular cavities lying radially inwardly and radially outwardly of the cutting surfaces.

Conveniently, fractured portions of the breakable member are retained after breakage in positions which are visible from the exterior of the device and which are displaced from positions adopted before breakage.

Preferably, the device has means for positioning of the load-receiving members in their working positions. Advantageously, the positioning means serve also to position the breakable member relative to the load-receiving members.

The positioning means conveniently comprise respective annular surfaces on the load-receiving members, the surfaces overlapping and lying adjacent each other when the load-receiving members are in their working positions. Advantageously, one of the annular positioning surfaces is received snugly in an aperture in the breakable member which it thus serves to position relative to the load-receiving members.

In a preferred arrangement, the load-receiving members and the breakable member have aligned apertures through which a rod or bar can be passed and, in such a device, an annular alignment surface on one load-receiving member may form at least a portion of the aperture extending therethrough. If the rod or bar is provided with a means for engaging one of the load-receiving members (for example a nut screw-threaded onto the rod or bar) and movement of the other load-receiving member is resisted, a load can be applied to the device by tensioning of the rod or bar. In this way, the load-indicating device of the invention can act as an end plate or pattress and can be used for setting a preload in a rock bolt or tie bar in a building or civil engineering application.

When the breakable member is apertured, it preferably comprises a plate having an annular portion with inwardly- or outwardly-protruding portions which are engaged by formations on the load-receiving members and are fractured when the predetermined load value is reached. By modification of the dimensions of the protruding portions and/or the formations on the load-receiving members, the predetermined load value can be altered. Preferably, this is achieved by changes in the dimensions of the protruding formations or the thickness or material of the plate so so that alteration of the load value is achieved without modification of the load-receiving members.

When apertured as mentioned above, one of the load-receiving members advantageously has a portion through which a portion of the aperture extends and which is movable relative to the remainder of the loadreceiving member. In this way, the orientation of a rod or bar received in the aperture of the movable portion relative to the load-receiving member can be varied. Conveniently, the movable portion has a part-spherical surface engaging a complementarily-shaped surface on the remaining portion of the load-receiving member, the aperture in which is preferably flared to allow angular movement of the rod or bar.

Figure 2:
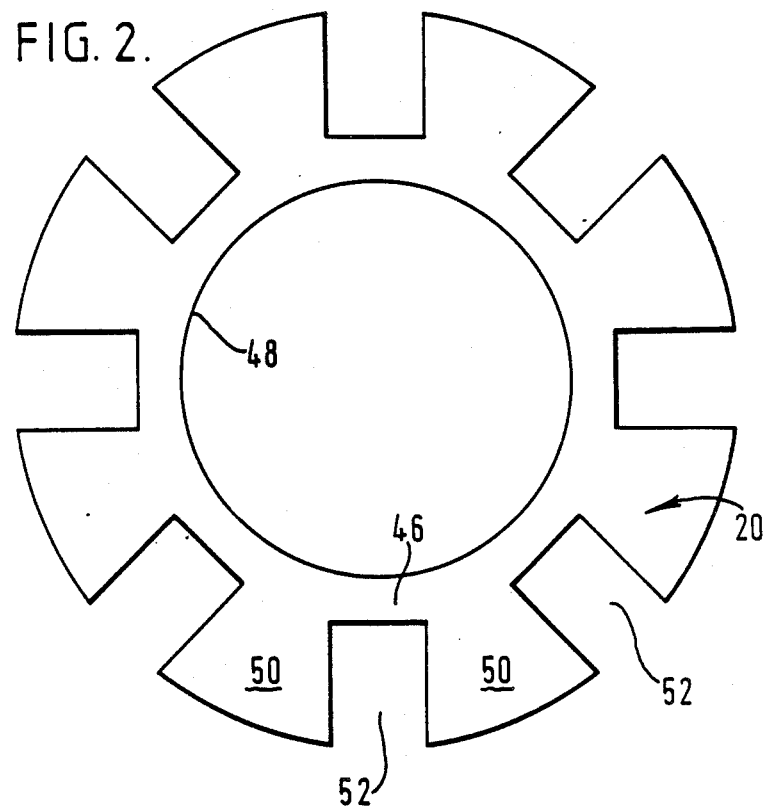
Figure 3A:
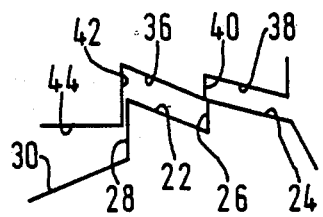
Figure 3B:
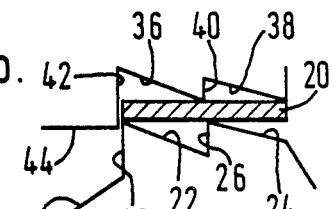
Figure 3C:
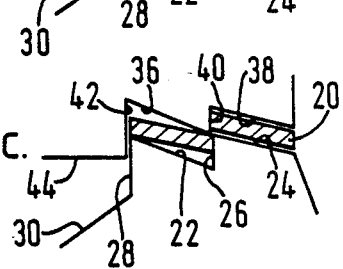
Figure 4:
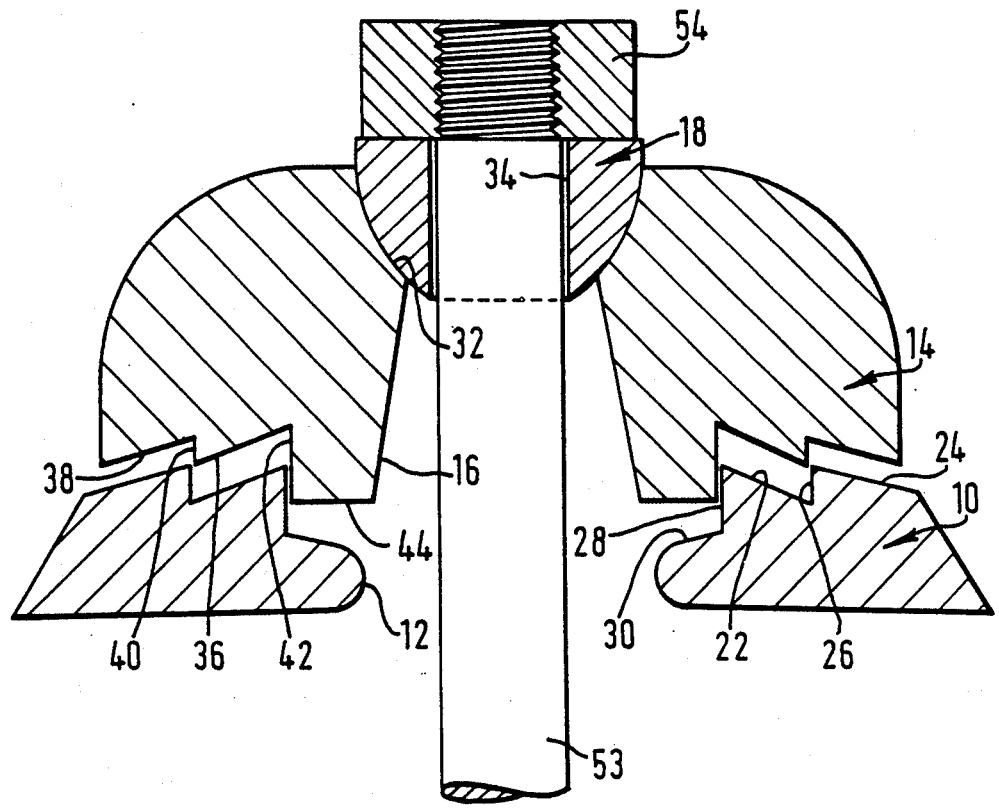

An embodiment of the invention will now be described by way of example with reference to the drawings, in which:

FIG. 1 is a vertical sectional view of a load-indicating device in the form of a load-indicating end plate, a shear plate of the device being omitted, FIG. 2 is a plan view of the shear plate omitted from FIG. 1, FIGS. 3a, 3b and 3c are scrap sectional views showing cutting teeth of the device of FIG. 1 and, in FIGS. 3b and 3c, also the shear plate of FIG. 2, and FIG. 4 is a view similar to FIG. 1 showing the device and a nut fitted to a lock bolt, a portion only of which is shown.

FIG. 1 of the drawings shows a first, annular load-receiving member 10, having a central circular aperture 12, and a second, load-receiving member 14 which has a central bore 16 and supports a part-spherical washer 18. The load-indicating device is completed by a breakable member in the form of an annular plate 20 which is shown in FIG. 2. The load-receiving members 10, 14 and the washer 18 are of SG iron, whilst the shear plate 20 is of mild steel. In other embodiments, other materials, such as stainless steel and non-ferrous metals, may be used.

The first load-receiving member 10 is circular in plan and has a base area to suit the load bearing properties of the substrate. Typically, the diameter of the load-receiving member is seven times the diameter of the bar or rod to be used with the device. The bar or rod will usually have a diameter within the range of 16 mm to 39 mm, thus giving a range of load-receiving members diameters of 112 mm to 273 mm.

The annular surface of the member which is uppermost in FIG. 1 has inner and outer ramped annular surfaces 22, 24 which, as shown, are inclined upwardly in the radially-inward direction. A cylindrical cutting surface 26 joins the ramped surfaces 22, 24 and, inwardly of the inner ramped surface 22, a cylindrical alignment surface 28, which provides annular alignment of the first and second load members, joins the inner ramped surfaces to an annular shoulder 30 which is inclined in the opposite direction to the ramped surfaces 22,24.

The second, domed load-receiving member 14 is also circular in plan and has in its upper surface a part-spherical seating 32 for support of the part-spherical washer 18. The washer 18 has a circular cylindrical bore 34 in which a screw-threaded rod or bar is a somewhat slack fit. By virtue of movement between the washer and its seating 32 and the frusto-conical shape of the bore 16, the rod or bar can adopt positions in which its axis is inclined to the axis of the frusto-conical bore 16.

The surface of the second load-receiving member 14. which confronts the first load-receiving member 10 has inner and outer ramped annular surfaces 36, 38 which are parallel to the ramped surfaces 22, 24 of the load-receiving member 10. The ramped surfaces 36, 38 are joined by a cylindrical cutting surface 40 which is parallel to the cylindrical cutting surface 26 of the first load-receiving member. A cylindrical alignment surface 42 extends parallel to the cylindrical alignment surface 28 to provide alignment of the load-receiving members. A further annular surface 44 extends between the cylindrical surface 42 and the wider end of the bore 16 in the second loadreceiving member 14 to face the inclined shoulder 30 on the first load-receiving member. The alignment and cutting portions of the load-receiving members are shown in more detail in FIG. 3a.

The annular plate 20 of this embodiment is about 4mm in thickness and, in other embodiments, will usually have a thickness in the range of 1 to 10 mm. The plate has an annular portion 46, defining a central circular aperture 48, and eight outwardly extending protruding portions 50 defined by gaps 52. The diameter of the aperture 48 is slightly greater than the diameter of the cylindrical surface 42 on the second load-receiving member 14, on which the plate 20 is positioned by reception of the aperture central boss formed by the surfaces 42 and 44 in the aperture 48 of the plate 20 The portions 50 of the plate 20 extend from the annular portion 46 to a radial distance equal to the radius of the outer edges of the outer ramped surfaces 38 on the second load-receiving member 14. The material and thickness of the shear plate 20 and the number and the sum of the circumferential widths of the protruding portions 50 at the radius of the cutting surfaces 26, 40 can be varied in order to set the predetermined load to be indicated by the device.

For use of the load-indicating device the parts shown in FIG. 1 are first assembled with the plate 20 positioned between the load-receiving members 10, 14 and the cylindrical surface 42 of the second load-receiving member 14 received in the aperture 48 of the shear plate. The members 10, 14 and plate 20 are shown in more detail in FIG. 3b. The tie rod or rock bolt is then passed through the aligned apertures 12, 48, 16, 34 and a nut fitted to a threaded end portion of the rod or bolt extending beyond the washer 18. With the first load-receiving member 10 supported by a fixed structure and the rod or bolt possibly inclined to the axis of the frusto-conical bore 16, the nut is tightened. When the tension in the rod or bolt corresponding to the breaking stress of the annular plate 20 is exceeded, the plate 20 is fractured by a shearing and bending action between the leading edges of the pair of cutting surfaces 26, 40, the radial spacing of the cutting surfaces determining the relative contributions of shearing and bending to the fracture.

The fractured plate is shown in more detail in FIG. 3c, it being evident that the protruding portions 50 of the shear plate 20 are fractured along a circular line corresponding to the radius of the cylindrical cutting surfaces 26, 40. The resulting relative movement of the load-receiving members 10, 14 when fracture takes place produces a visual indication that the predetermined load has been achieved and, moreover, a further visual indication is given by the fact that the peripheral gaps between the ramped surface 24 on the first load-receiving member 10 and the lower surfaces of the protruding portions 50 of plate 20 have become closed, the fractured parts of the portions being retained between the two device parts 10, 14.

One use of the load-indicating device described with reference to FIGS. 1–3 of the drawings is in the tensioning of a rock bolt used to stabilise a rock face in, for example, a mine. This is shown in FIG. 4. A blind bore is first drilled in the rock face. The rock bolt 53 is then inserted into the bore and secured by a suitable cement or grout. To stabilise the rock face, the bolt must be tensioned to a predetermined value by tightening of its nut 54. This is achieved by use of the load-indicating device described. Attainment of the predetermined load will serve to indicate that the bolt is properly secured to the rock. After tensioning, the device remains to serve as a load-distributing end plate. After tensioning and fracture of the plate 20, the rock bolt 53 can be re-tensioned to the same or a different predetermined value by removal of the nut 54, the second load-receiving member 14 and the fractured plate 20 and replacement of the plate before re-assembly of the load-receiving member and nut.

The load-indicating device according to the present invention has many other applications, for example as overload-indication devices in weighbridges and cables.

It will be appreciated that the bending contribution to the fracture will be zero when the clearance between the cutting surfaces is zero and will increase with increasing spacing. Thus, when the clearance is small as shown, the mode of fracture will be predominantly shearing with a small bending component.

It is evident that those skilled in the art will make numerous modifications of the specific embodiment dscribed above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

I claim:

1. A device for indicating attainment of a predetermined value of a load applied to the device, said device comprising
   a first member,
   a second member and
   a breakable member lying between said first and second members,
   said first and second members having respective faces directed towards each other and said faces of said first and second members having
   first co-operating formations which co-operate to guide said first and second members for relative movement in a first direction decreasing the separation between said first and second members and a second, opposite direction increasing said separation and
   second co-operating formations which co-operate when said load tending to cause relative movement of said first and second members in said first direction is applied to said device,
   said second co-operating formations comprising respective surfaces on the faces of said first and second members, said surfaces co-operating to cause breakage of said breakable member with an action which is at least partially shearing when said applied load attains said predetermined value, and
   said breakage of said breakable member providing an indication that said applied load has attained said predetermined value.

2. The device of claim 1, further comprising means for locating said breakable member on one of said first and second members against movement relative thereto in directions transverse to said first and second directions.

3. The device of claim 1, wherein said first co-operating formations comprise a first cylindrical alignment surface formed in said face of said first member and a seocnd cylindrical alignment surface formed in said face of said second member, said first and second cylindrical alignment surfaces having respective axes which are aligned with said first and second directions.

4. The device of claim 1, wherein said second co-operating formations comprise a fitst cylindrical breakage surface formed in said face of said first member and a second cylindrical breakage surface formed in said face of said second member, said first and second cylindrical breakage surfaces having respective axes which are aligned with said first and second directions.

5. The device of claim 1, wherein said first co-operating formations comprise a first cylindrical alignment surface formed in said face of said first member and a second cylindrical alignment surface formed in said face of said second member, said first and second cylindrical alignment surfaces having respective axes which are aligned with said first and second directions, and
   said second co-operating formations comprise a first cylindrical breakage surface formed in said face of said first member and a second cylindrical breakage surface formed in said face of said second member, said first and second cylindrical breakage surfaces having respective axes which are aligned with said first and second directions,
   said first and second cylindrical breakage surfaces being concentric with said first and second cylindrical alignment surfaces and located radially outwardly of said first and second cylindrical alignment surfaces.

6. The device of claim 1, wherein said first co-operating formations comprise a first cylindrical aligment surface formed in said face of said first member and a second cylindrical alignment surface formed in said face of said member, said first and second cylindrical alignment surfaces having respective axes which are aligned with said first and second directions, and
   said second co-operating formations comprise a first cylindrical breakage surface formed in said face of said first member and a second cylindrical breakage surface formed in said face of said second member, said first and second cylindrical breakage surfaces having respective axes which are aligned with said first and second directions,
   said cylindrical alignment surface and said cylindrical breakage surface of said first member being joined by a first annular surface which is inclined to said first and second directions,
   said cylindrical alignment surface and said cylindrical breakage surface of said second member being joined by a second annular surface which is inclined to said first and second directions, and
   said first and second annular surfaces defining therebetween an annular cavity, for reception of a fragment of said breakable member after said breakage thereof.

7. The device of claim 6, wherein said first and second annular surfaces are planar and extend parallel to each other.

8. The device of claim 1, wherein said first co-operating formations comprise a first cylindrical alignment surface formed in said face of said first member and a second cylindrical alignment surface formed in said face of said second member, said first and second cylindrical alignment surfaces having respective axes which are aligned with said first and second directions, and
   said second co-operating formations comprise a first cylindrical breakage surface formed in said face of said first member and a second cylindrical breakage surface formed in said face of said second member, said first and second cylindrical breakage surfaces having respective axes which are aligned with said first and second directions, said first and second cylindrical alignment surfaces being located radially inwardly of said first and second cylindrical breakage surfaces, and said first and second members being shaped outwardly of said first and second cylindrical breakage surfaces to define between said first and second members at least one recess which is open to visual inspection from the exterior of the device, said at least one recess receiving a portion of said breakable member, and said portion occupying respective first and second different positions relative to said first and second members prior to and after said breakage, whereby said breakage of said breakable member having taken place can be detected visually by inspection as to which of said positions is occupied by said breakable member portion and a said sensorily-perceptible indication thereby achieved.

9. The device of claim 1, wherein said first and second members and said breakable member are each annular and have respective apertures which overlap to form a passage extending through said device.

10. The device of claim 1, wherein said breakable element comprises an annular portion and a plurality of portions extending outwardly therefrom, said second co-operating formations co-operating to cause breakage of said breakable element at locations on said outwardly-extending portions.

11. The device of claim 2, wherein said breakable element is annular and receivable around one of said cylindrical alignment surfaces in order to locate said breakable element against said relative transverse movement.

12. An end plate or pattress having means for indicating attainment of a predetermined load applied thereto, said end plate or pattress comprising a first annular member, a second annular member, and an annular breakable member lying between said first and second annular members, said first annular member, said second annular member and said annular breakable member having respective openings which overlie to form a passage extending through said end plate or pattress, said first annular member being engageable by an elongate load-application member extending through said passage to apply a load to said end plate or pattress, said first and second annular members having respective faces directed towards each other and said faces of said first and second annular members having first co-operating formations which co-operate to guide said first and second annular members for relative movement in a first direction decreasing the separation between said first and second members and a second, opposite direction increasing said separation and second co-operating formations which co-operate when said load tending to cause relative movement of said first and second members in said first direction is applied ot said end plate or pattress through said elongate member, said co-operation between said second formations causing breakage of said breakable member when said applied load attains said predetermined value, and said breakage of said breakable member providing an indication that said applied load has attained said predetermined value.

13. The end plate or pattress of claim 12, wherein said first annular member comprises a first portion having said face thereon and a second portion which is moveable relative to said first portion, said passage through said first annular member extending through said first and second portions thereof, and said first portion of said first annular member being engageable by said elongate member, whereby said elongate member can adopt any of a plurality of possible orientations relative to said first portion of said first annular member through movement of said second portion of said first annular members relative to said first portion.

14. The end plate or pattress of claim 13, wherein said first and second portions have respective part-spherical surfaces which co-operate to permit said relative movement of said portions.

15. The end plate or pattress of claim 13, wherein said second portion is located at an end of said through passage of first portion distant from said face of said first, said passage flaring outwardly in cross-section in the direction away from said second portion.

16. The device of claim 12, wherein said second co-operating formations comprise respective surfaces on said first and second annular members, said surfaces co-operating to cause breakage of said breakable member with an action which is at least partially shearing when said applied load attains said predetermined value.

* * * * *